(12) United States Patent
McGrath

(10) Patent No.: US 11,608,853 B2
(45) Date of Patent: Mar. 21, 2023

(54) PIVOT FOR A MOUNTING DEVICE

(71) Applicant: ADVANCED DESIGN MFG LLC, Antioch, CA (US)

(72) Inventor: Andrew Hascall McGrath, Lafayette, CA (US)

(73) Assignee: ADVANCED DESIGN MFG LLC, Antioch, CA (US)

( * ) Notice: Subject to any disclaimer, the term of this patent is extended or adjusted under 35 U.S.C. 154(b) by 139 days.

(21) Appl. No.: 16/792,824

(22) Filed: Feb. 17, 2020

(65) Prior Publication Data
US 2021/0254657 A1 Aug. 19, 2021

(51) Int. Cl.
F16C 11/10 (2006.01)
F16B 7/04 (2006.01)
F16C 11/04 (2006.01)
F16C 11/08 (2006.01)

(52) U.S. Cl.
CPC .............. *F16C 11/04* (2013.01); *F16B 7/048* (2013.01); *F16C 11/08* (2013.01); *Y10T 403/32098* (2015.01)

(58) Field of Classification Search
CPC ......... F16C 11/04; F16C 11/103; F16C 11/10; Y10T 403/32098; Y10T 403/32606; Y10T 403/342; Y10T 403/347; Y10T 403/32262; Y10T 403/32319; F16B 7/044; F16B 7/048; F16B 37/0828; F16M 11/08
See application file for complete search history.

(56) References Cited

U.S. PATENT DOCUMENTS

| | | | | |
|---|---|---|---|---|
| 1,579,159 A * | 3/1926 | Spikings | ................... | F16B 7/04 403/64 |
| 2,212,455 A * | 8/1940 | Reed | ....................... | F16B 7/185 403/64 |
| 3,322,886 A * | 5/1967 | Hawsky | .................. | F16C 11/04 174/86 |
| 7,338,242 B2 * | 3/2008 | Ellis | .................... | F16B 37/0828 411/260 |
| 8,936,223 B1 * | 1/2015 | McGrath | ............... | F16C 11/103 248/219.4 |
| 8,973,876 B1 * | 3/2015 | McGrath | ................ | F16M 11/24 248/205.1 |
| 2004/0245513 A1 * | 12/2004 | Izumi | .................. | E04F 11/1817 256/65.02 |

* cited by examiner

*Primary Examiner* — Michael P Ferguson
(74) *Attorney, Agent, or Firm* — Quarles & Brady LLP

(57) ABSTRACT

A pivot for a mounting device is disclosed. The pivot includes a first bracket having a base member configured to mount a structural member and a plurality of elongated members. Further, the pivot includes one or more second brackets. The one or more second brackets having a first member and a second member. The first member having an orifice and is configured to be fitted around the plurality of elongated members of the first bracket. The second member is coupled to the first member and has a second bracket through-hole. The pivot further includes a covering member configured to be fitted on the plurality of elongated members. The covering member includes a first part having a groove and a second part that is configured to be fitted inside the plurality of elongated members. The second part is fastened along the plurality of elongated members.

20 Claims, 4 Drawing Sheets

PIVOT FOR A MOUNTING DEVICE

FIELD OF THE DISCLOSURE

The present disclosure is generally related to pivots, and more particularly related to a pivot for a mounting device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Pivots of various types have long been utilized to mount various devices on structural members. The various devices, such as screens, biometrics, card machine, etc., are mounted on the structural members for being accessed by users in public places, such as malls, showrooms, etc. Further, in the entertainment industry, theater lightning fixtures are usually mounted by clamps to horizontal and/or vertical structures to obtain required lighting for a particular scene. Furthermore, at homes and offices, television screens and computer monitors are mounted to the structural members for ease of use and saving space in an area. However, in case of even minute angle changes, the pivots or clamps need to be removed and reinstalled at desired angle. Such removal and reinstallation of the pivots or clamps adds to cost, time, and affects ease of use of the users.

Typically, ball gimbals are used along with a simple knob-type pivot mount, a square slot, and a control arm to provide ease of change in angle as desired of the mounted device. However, such ball gimbals maintain position and create pivoting ability around only a small number of pivots. Further, the lack of a sufficient number of pivots often limits a positioning ability of support arms and the mounted devices to only a small number of pivot axes. Further, mostly all mounting devices require one or more cables for connection of power or signals. However, the present technology only allows for mounting of the various devices and provides no housing for the cables. Therefore, the one or more cables lie unprotected and also make the area appear unpleasing and messy. Hence, there is a requirement for a mounting device to provide ease of movement at various angles and simultaneously provide a housing for power and connection cables.

Therefore, there is a need for an improved design of a pivot for a mounting device to overcome the above mentioned challenges.

SUMMARY OF THE INVENTION

According to embodiments illustrated herein, a pivot for a mounting device is disclosed. The pivot includes a first bracket having a base member configured to mount a structural member and a plurality of elongated members. Further, the pivot includes one or more second brackets having a first member. The first member having an orifice. Further, a second member is coupled to the first member, and having a second bracket through-hole. Further, the first member of the one or more second brackets, is configured to be fitted around the plurality of elongated members via the orifice to dispose the one or more second brackets over the first bracket. The pivot further includes a covering member configured to be fitted on the plurality of elongated members. Further, the covering member includes a first part having a groove. Further, a second part is configured to be fitted inside the plurality of elongated members. Thereafter, the second part is fastened along the plurality of elongated members, thereby making the pivot.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
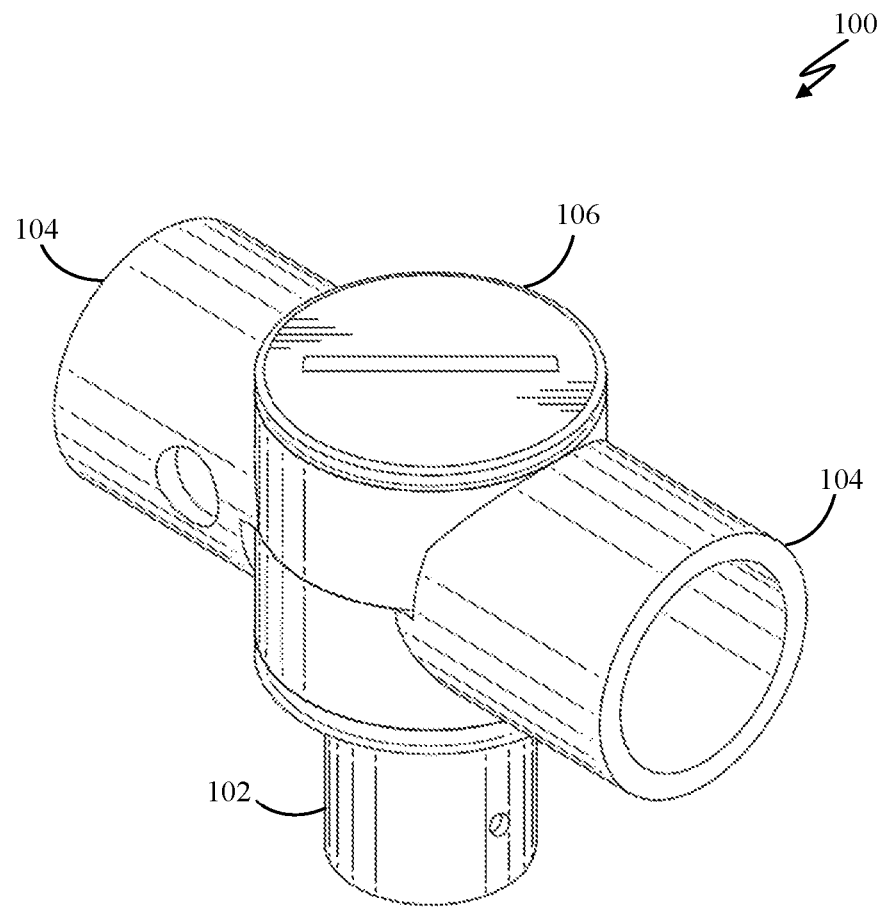
FIG. 1 is a perspective view of a pivot for a mounting device, in accordance with the present disclosure.
Figure 2:
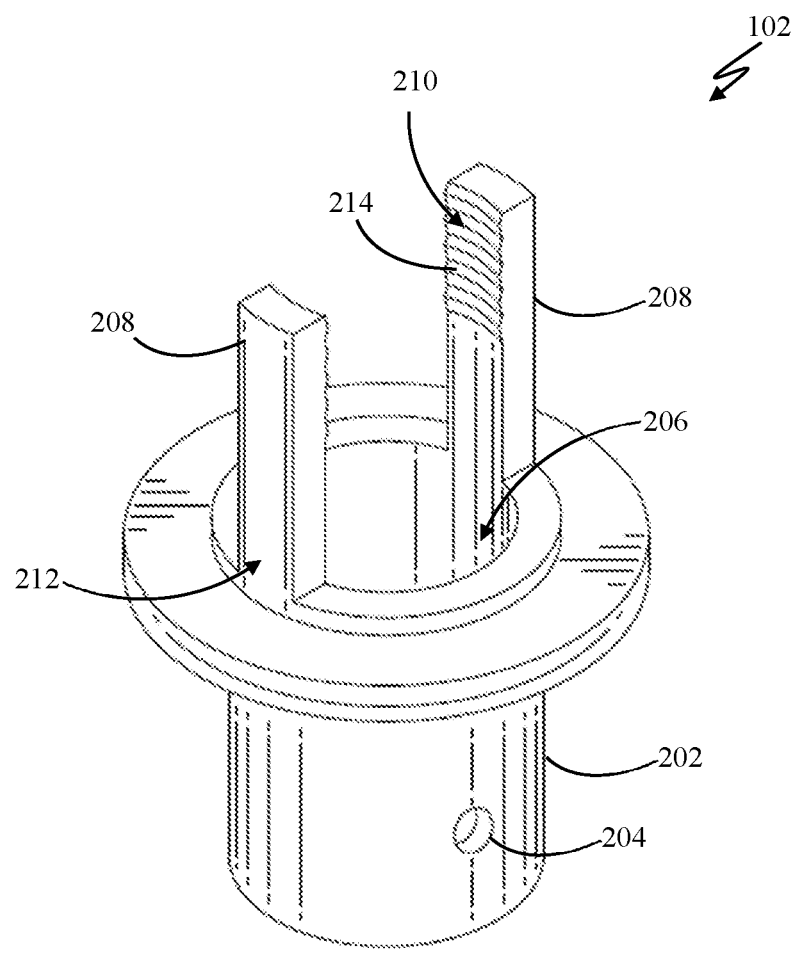
FIG. 2 is a perspective view of a first bracket of the pivot of FIG. 1.

FIG. 1 illustrates a pivot 100 for a mounting device, according to an embodiment. The pivot 100 may include a first bracket 102, one or more second brackets 104 configured to be fitted over the first bracket 102, and a covering member 106. In one embodiment, as shown in FIG. 2, the first bracket 102 may include a base member 202 that is configured to mount a structural member (not shown). The structural member may be, but is not limited to, a tube, a bar, a rod, or a pipe. In the illustrated embodiment, the base member 202 has one or more holes 204 and a first bracket through-hole 206. The one or more holes 204 may be configured to receive a set screw (not shown) for affixing the pivot 100 to the structural member through compression. The set screw may be used to adjust the height of the pivot 100 on the structural member. In one case, the set screw may be made of a compressional plastic. In another case, the set screw may be made of silicone. In yet another case, the set screw may be made of a metal.

It should be noted that the set screw may be made of some other material as well, without departing from the scope of the disclosure. Further, the first bracket 102 may include a plurality of elongated members 208. The plurality of elongated members 208 may have an inner surface 210 and an outer surface 212. The inner surface 210 of the plurality of elongated members 208 may have a plurality of threads 214. Further, the plurality of elongated members 208 may be configured to receive the one or more second brackets 104.

Figure 3:
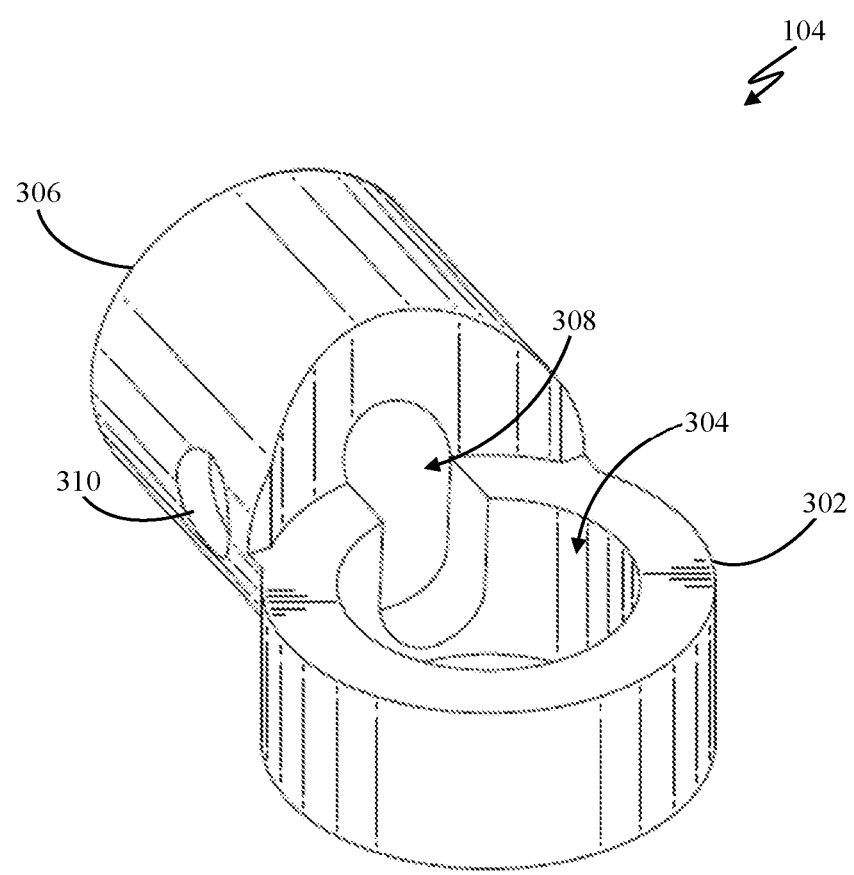
FIG. 3 is a perspective view of a second bracket of the pivot of FIG. 1.

As shown in FIG. 3, each of the one or more second brackets 104 may include a first member 302 having an orifice 304. The first member 302 may be configured to be fitted around the plurality of elongated members 208 via the orifice 304. Further, each of the one or more second brackets 104 may include a second member 306 coupled to the first member 302. The second member 306 may have a second bracket through-hole 308 configured to receive one or more wires (not shown). Further, the second member 306 may be used to mount a stand of the mounting device. For example, the second member 306 may be used to mount a stand of a smart television. In an exemplary embodiment, the one or more wires may pass through the second bracket through-hole 308 of the second member 306 of the one or more second brackets 104 and the first bracket through-hole 206 of the base member 202 of the first bracket 102. Further, the second member 306 of each of the one or more second brackets 104 may have one or more holes 310. The one or more holes 310 of the second member 306 of the one or more second brackets 104 may be configured to receive a fastener (not shown) to affix the mounting device. In one case, the fastener may be made of a compressional plastic. In another case, the fastener may be made of silicone. In yet another case, the fastener may be made of a metal. In one embodiment, the one or more holes 310 on the second member 306 of the one or more second brackets 104 may be threaded and configured to receive a set screw (not shown) to affix the mounting device. The set screw may be made at least of compressional silicone, rubber, plastic, or like type material.

In an illustrated embodiment, the pivot 100 may include two second brackets 104 configured to be fitted one over the other and around the plurality of elongated members 208. In one case, the one or more second brackets 104 may be configured to rotate 360 degrees around the axis of the plurality of elongated members 208. Further, the one or more second brackets 104 may be disposed over the first bracket 102. It should be noted that the one or more second brackets 104 may rotate freely around the axis of the plurality of elongated members 208, without departing from the scope of the disclosure.

Figure 4:
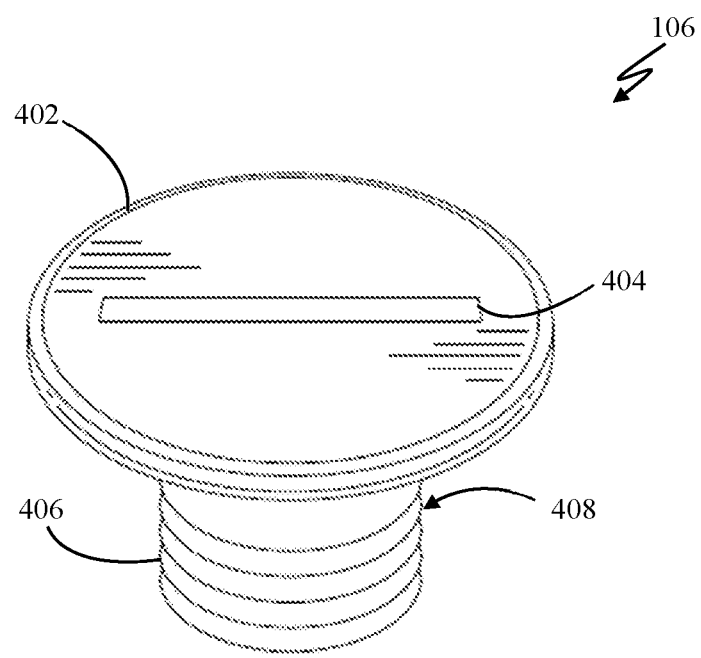
FIG. 4 is a perspective view of a covering member of the pivot of FIG. 1.

Further, the pivot 100 may include the covering member 106 that is configured to be fitted on the plurality of elongated members 208 of the first bracket 102. The covering member 106 may include a first part 402 having a groove 404, as shown in FIG. 4. In one case, the groove 404 may be used to tighten the covering member 106 using a screw driver (not shown). Further, the covering member 106 may include a second part 406. The second part 406 may be configured to be fitted inside the plurality of elongated members 208. In one case, the second part 406 of the covering member 106 may have a plurality of threads 408 configured to be fitted in the plurality of threads 214 on the inner surface 210 of the plurality of elongated members 208. Further, the covering member 106 may be tightened on the plurality of elongated members 208 to affix the one or more second brackets 104 at a required angle.

It should be noted that the plurality of elongated members 208 may have a predefined height. The predefined height may be based on a number of the one or more second brackets 104, such that the one or more second brackets 104 may be completely locked upon tightening the covering member 106. It will be apparent to one skilled in the art that the pivot 100 may be made of a material selected from a group of materials including, but not limited to a metal, an alloy, plastic, or wood. In an example, the first bracket 102 and the one or more second brackets 104 may be made of a variety of materials including metal and non-metals. In one embodiment, the pivot 100 may be designed to mount a ranging thickness of tubes on a ranging thickness of surfaces, without departing from the scope of the disclosure.

The disclosed embodiments encompass numerous advantages. Various embodiments of the pivot for a mounting device have been disclosed. Such pivots may be fitted to a structural member of variable thickness. Such pivots have the ability to rotate freely around the axis of a plurality of elongated members. Additionally, the pivots may be used to adjust angle of the mounted device as per the requirements of a user. Further, such pivots improve speed and ease of use by allowing the pivots to be assembled on-site. Further, the pivots may be designed as per the required number of second brackets based on the number of the mounting devices. Further, the pivots allow smooth passing of cables or wires of the mounting device relieving the user off any additional cables or wires protection. Therefore, such designs of pivots are optimal and easy to use.

The features of the present invention will be apparent with reference to the description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

While the preferred embodiment of the present invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A pivot for a mounting device, the pivot comprising:
 a first bracket including:
  an elongated base member having a first end, a second end opposite the first end, a longitudinal axis extending through the first and second ends, and a first bracket through-hole extending along the longitudinal axis through the first and second ends of the base member, the first bracket through-hole being configured to slidably receive a structural member; and a plurality of elongated members coupled to the second end of the base member, the plurality of elongated members being arranged about a perimeter of the first bracket through-hole that is defined on the second end of the base member and extending outwardly from the second end of the base member along the longitudinal axis away from the first end of the base member;

at least one second bracket that is arranged on the second end of the base member of the first bracket, the at least one second bracket including:

a first member having a first end contacting the second end of the base member of the first bracket, a second end opposite the first end of the first member, and an orifice extending through the first and second ends of the first member, the orifice being configured to rotatably receive a radially outer surface of the plurality of elongated members of the first bracket at the first end of the first member; and a second member extending laterally outward from the first member, the second member having a second bracket through-hole extending through the second member that is configured to slidably receive the mounting device; and a covering member including a first part, and a second part extending downwardly from the first part, the second part of the covering member being configured to be inserted into the orifice at the second end of the first member of the at least one second bracket to threadably engage a radially inner surface of the plurality of elongated members of the first bracket such that the at least one second bracket is rotatable relative to the longitudinal axis of the base member of the first bracket as the orifice of the first member of the at least one second bracket maintains contact with an outer surface of the plurality of elongated members, wherein, when the covering member is fully tightened, the at least one second bracket is secured at an angle relative to the longitudinal axis of the base member of the first bracket between the second end of the base member of the first bracket and the first part of the covering member.

2. The pivot of claim 1, wherein the first part of the covering member includes a groove to tighten the covering member relative to the base member of the first bracket.

3. The pivot of claim 1, wherein the inner surface of the plurality of elongated members include a plurality of threads, and wherein the second part of the covering member has a plurality of threads configured to threadably engage the plurality of threads of the inner surface of the plurality of elongated members.

4. The pivot of claim 1, wherein the plurality of elongated members extend into the orifice of the first member of the at least one second bracket between the first and second ends of the first member of the at least one second bracket.

5. The pivot of claim 1, wherein the plurality of elongated members have a predefined height based on a height of the first member of the at least one second bracket.

6. The pivot of claim 5, wherein the at least one second bracket includes a lower second bracket arranged on the second end of the base member of the first bracket and an upper second bracket arranged on the lower second bracket, wherein the plurality of elongated members are configured to extend at least partially into each of the orifices of the upper and lower second brackets, and wherein the lower second bracket is rotatable to a plurality of angles relative to the upper second bracket.

7. The pivot of claim 1, wherein the second member of the at least one second bracket includes one or more holes extending into the second bracket through-hole.

8. The pivot of claim 7, wherein the one or more holes of the second member of the at least one second bracket are configured to receive a fastener to secure the mounting device within the second bracket through-hole of the second member of the at least one second bracket.

9. The pivot of claim 1, wherein the at least one second bracket is configured to be rotatable to a plurality of angles relative to the longitudinal axis of the base member of the first bracket.

10. The pivot of claim 1, wherein the second bracket through-hole of the second member of the at least one second bracket is configured to receive one or more wires.

11. A pivot for a mounting device, the pivot comprising:
a first bracket including:
an elongated base member having a first end, a second end opposite the first end, a longitudinal axis extending through the first and second ends, and a first bracket through-hole extending along the longitudinal axis through the first and second ends of the base member, the first bracket through-hole being configured to slidably receive a structural member; and at least two elongated members coupled to the second end of the base member, the at least two elongated members being arranged on the second end of the base member adjacent to the first bracket through-hole and extending outwardly from the second end of the base member along the longitudinal axis away from first end of the base member;

a second bracket arranged on the second end of the base member of the first bracket, the second bracket including:

a first member having a first end contacting the second end of the base member of the first bracket, a second end opposite the first end of the first member, and an orifice extending through the first and second ends of the first member and aligned with the first bracket through-hole of the base member of the first bracket, the orifice being configured to at least partially rotatably receive the at least two elongated members of the first bracket at the first end of the first member when the first end of the first member contacts the second end of the base member of the first bracket; and a second member extending radially outward from the first member of the second bracket, the second member having a second bracket through-hole extending through the second member that is configured to slidably receive the mounting device; and a covering member including a first part and a second part extending downwardly from the first part, the second part being configured to be inserted into the orifice at the second end of the first member of the second bracket and within the at least two elongated members of the first bracket, wherein the second part of the covering member is configured to threadably engage an inner surface of the at least two elongated members such that the second bracket is rotatable relative to the longitudinal axis of the base member of the first bracket as the orifice of the first member of the second bracket maintains contact with an outer surface of the at least two elongated members, and is configured to removably secure the second bracket at an angle relative to the longitudinal axis of the base member of the first bracket between the second end of the base member of the first bracket and the first part of the covering member when the covering member is fully tightened.

12. The pivot of claim 11, wherein, with the second part of the covering member received within the orifice at the second end of the first member of the second bracket, the first part of the covering member slidably contacts the second end of the first member of the second bracket.

13. The pivot of claim 11, wherein the inner surface of the at least two elongated members of the first bracket includes a plurality of threads, and
wherein the second part of the covering member includes a plurality of threads configured to threadably engage the plurality of threads of the inner surface of the at least two elongated members such that the covering member can be tightened to the first bracket.

14. The pivot of claim 13, wherein, with the covering member tightened to a first tightness, the second bracket is rotatable to a plurality of angles relative to the longitudinal axis of the base member of the first bracket as the orifice of the first member of the second bracket maintains contact with an outer surface of the at least two elongated members of the first bracket, and
wherein, with the covering member tightened to a second tightness that is greater than the first tightness, the second bracket is secured at one of the plurality of angles relative to the longitudinal axis of the base member of the first bracket.

15. A pivot for a mounting device, the pivot comprising:
a first bracket including:
an elongated base member having a first end, a second end opposite the first end, a longitudinal axis extending through the first and second ends, and a first bracket through-hole extending along the longitudinal axis through the first and second ends of the base member, the first bracket through-hole being configured to slidably receive a structural member; and
a plurality of elongated members coupled to the second end of the base member and arranged adjacent to the first bracket through-hole at the second end of the base member, the plurality of elongated members extending outwardly from the second end of the base member along the longitudinal axis away from the first end of the base member;
a lower second bracket and an upper second bracket, each including:
a first member having an orifice extending through the first member; and
a second member extending outwardly from the first member, the second member having a second bracket through-hole extending at least partially into the second member toward the first member, the second bracket through-hole being configured to slidably receive the mounting device,
the lower second bracket being arranged on the second end of the base member of the first bracket and the upper second bracket being arranged on the lower second bracket such that the orifices of the first members of the lower and upper second brackets each at least partially rotatably receive the plurality of elongated members of the first bracket; and
a covering member including a first part and a second part extending downwardly from the first part, the second part of the covering member being configured to be inserted into each of the orifices of the lower and upper second brackets and within the plurality of elongated members of the first bracket,
wherein the second part of the covering member threadably engages the plurality of elongated members of the first bracket such that the lower and upper second brackets are rotatable relative to the longitudinal axis of the base member of the first bracket as the orifices of the first members of the lower and upper second brackets maintain contact with an outer surface of the plurality of elongated members, and removably secures each of the lower and upper second brackets at an angle relative to the longitudinal axis of the base member of the first bracket between the second end of the base member of the first bracket and the first part of the covering member when the covering member is fully tightened.

16. The pivot of claim 15, wherein the lower and upper second brackets are rotatable to a plurality of angles relative to the longitudinal axis of the base member of the first bracket as each of the orifices of the lower and upper second brackets maintain contact with an outer surface of the plurality of elongated members of the first bracket.

17. The pivot of claim 16, wherein an inner surface of the plurality of elongated members of the first bracket includes a plurality of threads, and
wherein the second part of the covering member includes a plurality of threads configured to threadably engage the plurality of threads of the inner surface of the plurality of elongated members.

18. The pivot of claim 17, wherein the covering member is configured to secure each of the lower and upper second brackets at one of the plurality of angles relative to the longitudinal axis of the base member of the first bracket.

19. The pivot of claim 15, wherein the first members of the lower and upper second brackets each have a lower end and an upper end opposite the lower end,
wherein the lower end of the first member of the lower second bracket slidably contacts the second end of the base member of the first bracket, and
wherein the lower end of the first member of the upper second bracket slidably contacts the upper end of the first member of the lower second bracket.

20. The pivot of claim 19, wherein the second members of the lower and upper second brackets each have an inner end, an outer end opposite the inner end, a lower side, and an upper side opposite the lower side,
wherein the inner end of the second member of the lower second bracket is connected to the first member of the lower second bracket such that the upper side of the second member of the lower second bracket extends upwardly from the upper end of the first member of the lower second bracket and slidably contacts an outer surface of the first member of the upper second bracket, and
wherein the inner end of the second member of the upper second bracket is connected to the first member of the upper second bracket such that the lower side of the second member of the upper second bracket extends downwardly from the lower end of the first member of the upper second bracket and slidably contacts an outer surface of the first member of the lower second bracket.

* * * * *